Patented Nov. 11, 1947

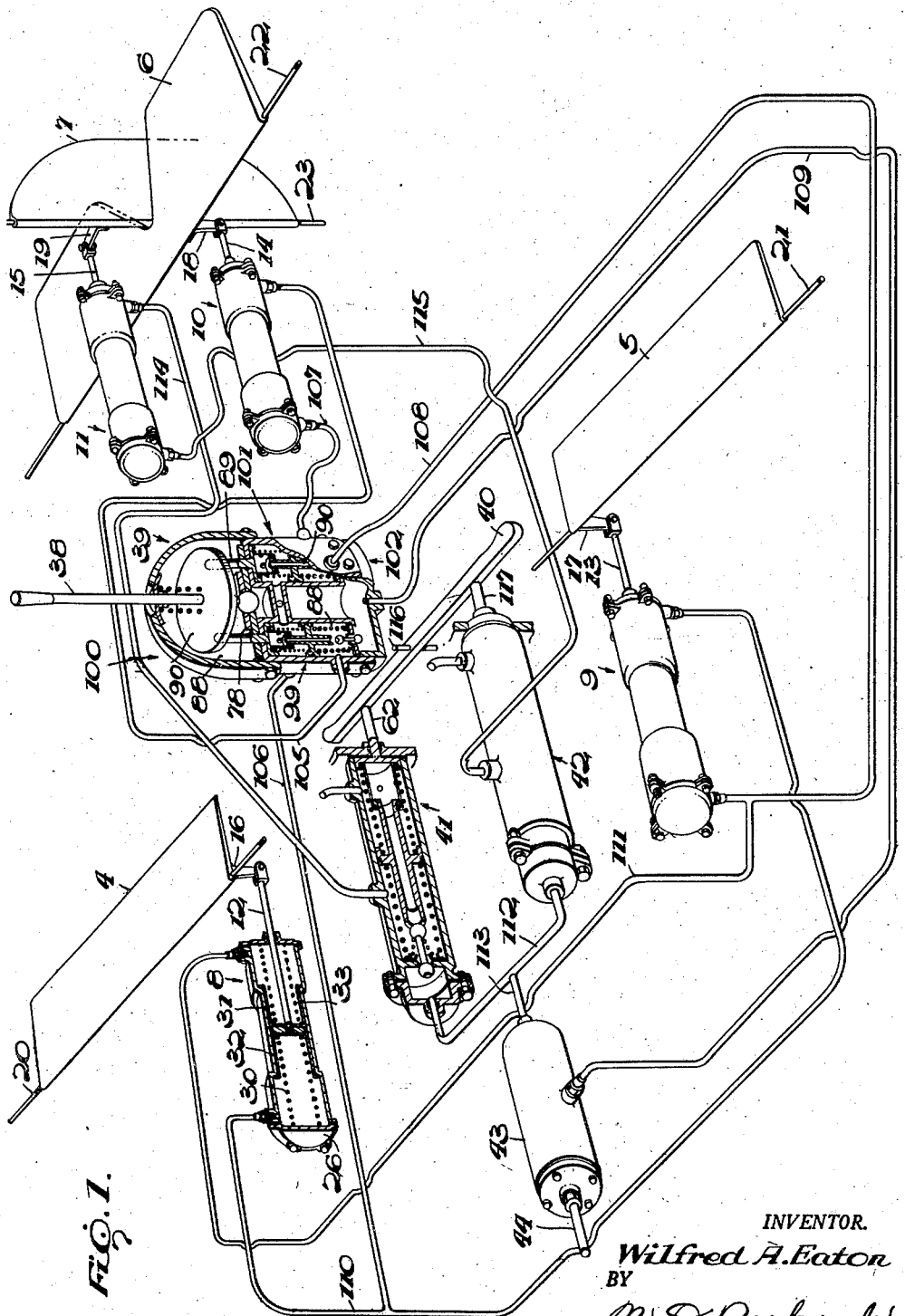

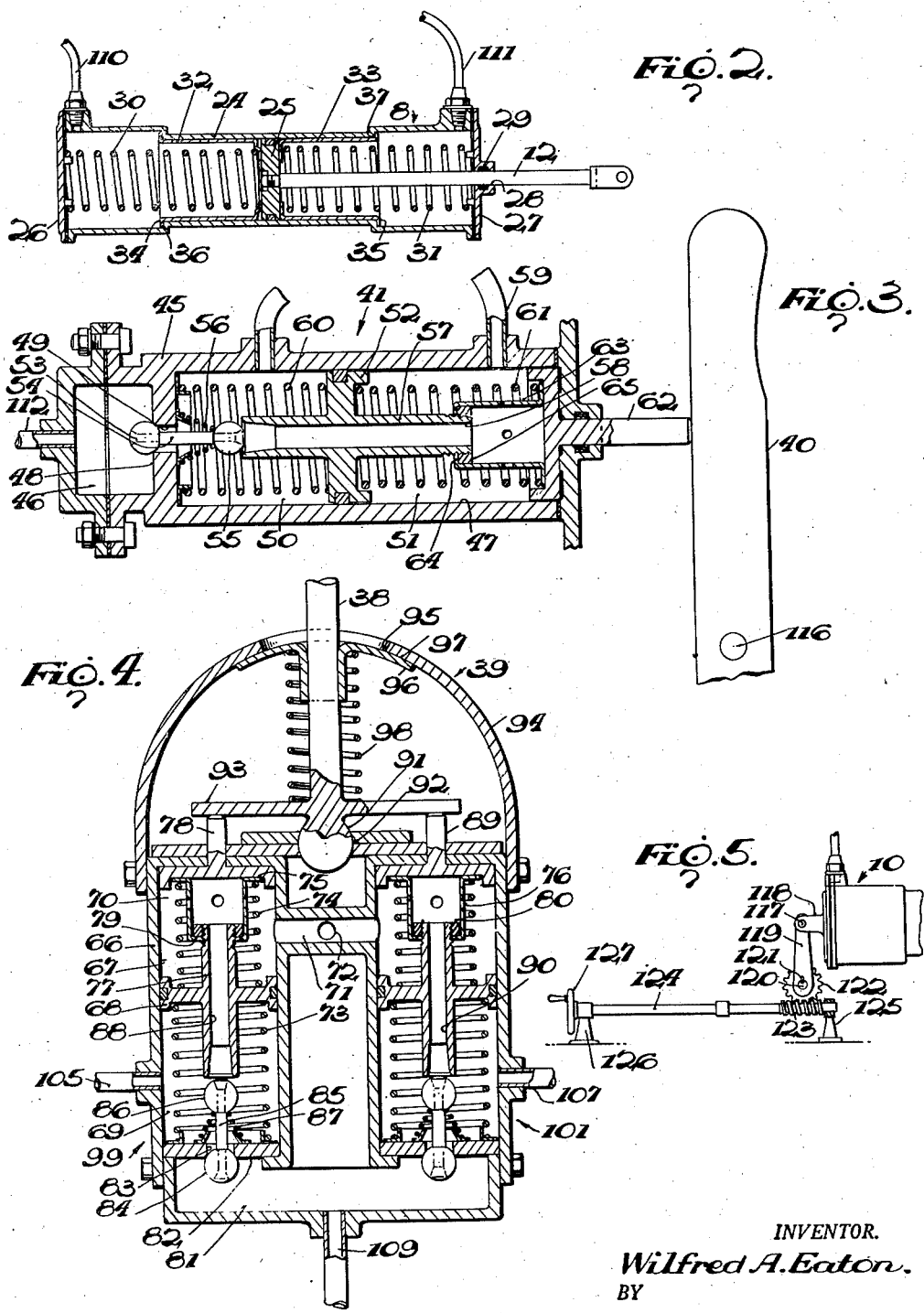

2,430,808

UNITED STATES PATENT OFFICE 2,430,808

FLUID PRESSURE CONTROL SYSTEM FOR AIRCRAFT

Wilfred A. Eaton, Elyria, Ohio, assignor to Bendix-Westinghouse Automotive Air Brake Company, Elyria, Ohio, a corporation of Delaware Application June 14, 1943, Serial No. 490,813

4 Claims. (Cl. 244—85)

1

This invention relates to power-operated control mechanisms and more particularly to fluid pressure control mechanism for airplanes.

It has previously been proposed to employ power-operated mechanisms for controlling the operation of airplanes, but it has been found in previous installations of this type, that it has been difficult to provide a control completely responsive to the will of the pilot, and it has also been found that, due to the inherent lack of flexibility of the systems used, it has been possible under certain conditions for the pilot to so manipulate the controls as to overstress the airplane, and it is accordingly one of the objects of the present invention to provide means for overcoming these difficulties.

Another object of the invention is to provide fluid pressure control mechanism for airplanes so constituted as to normally maintain the control surfaces in neutral position.

A further object of the invention is to provide, in connection with a system of the above type, means controlled by the pilot for accomplishing complete and instantaneous control of the control surfaces in response to operation of the pilot's control element.

Yet another object of the invention is to provide fluid pressure actuated means for operating the control surfaces of an airplane having means for normally maintaining the surfaces in neutral position with a predetermined degree of force, together with valve mechanism controlled by the pilot's control element, so constituted as to immediately supply to the fluid pressure actuator, on initial movement of the control element, sufficient pressure to overcome the force maintaining the control surface in neutral position, and on further movement of the control element, to supply pressure to the actuator which increases in proportion to the degree of further movement of the control element.

A still further object of the invention is to provide, in connection with a system of the above type, means for operating the various control surfaces of the airplane by means of a resilient force supplied thereto by suitable fluid actuators, together with means for normally maintaining said control surfaces in neutral position without, however, detracting from the ability of the pilot to safely and satisfactorily control the operation of the surfaces.

Another object of the invention is to provide, in a system of the above type, means under the control of the pilot for readily adjusting or changing the neutral position of the control surfaces.

These and other objects of the invention will be readily apparent when taken in connection with the accompanying drawings, wherein two embodiments of the invention are illustrated. It

2 is to be expressly understood, however, that the drawings are employed for purposes of illustration only, and are not designed as a definition of the limits of the invention, reference for this purpose being had to the appended claims.

In the drawings, wherein similar reference characters refer to similar parts throughout the several views, Fig. 1 is a perspective view, partially in section, of an airplane control system constructed in accordance with the principles of the present invention;

Fig. 2 is a view, partially in section, of one of the fluid actuators included in the mechanism shown in Fig. 1;

Fig. 3 is a sectional view of one of the control valves shown in Fig. 1;

Fig. 4 is a sectional view of another of the control valves shown in Fig. 1, and Fig. 5 illustrates diagrammatically, a further modification of the invention.

The present invention is illustrated generally as applied to an airplane, not shown, having movable control surfaces including right and left ailerons 4 and 5, an elevator 6 and a rudder 7, these surfaces being controlled respectively by fluid motors 8, 9, 10 and 11, these motors all being of the so-called double acting type and being connected to the control surfaces through the medium of piston rods 12, 13, 14 and 15, the latter being connected to levers 16, 17, 18 and 19 attached respectively to the control surfaces, it being understood that the ailerons are mounted for pivotal movement about axes 20 and 21, while the elevator and rudder are mounted for movement in their respective planes about axes 22 and 23.

All of the fluid motors are generally of the construction shown more particularly in connection with motor 8, and referring more particularly to Fig. 2 of the drawings, it will be noted that the motor 8 comprises a cylinder 24 having a piston 25 slidably mounted therein and having an operative connection with the piston rod 12. The motor is closed at the left end by means of an end plate 26 and at its right end by means of a cover plate 27 provided at its center with a bore 28 adapted to slidably receive the piston rod 12, the escape of fluid at this point being prevented by means of a sealing member 29 positioned in the bore 28. The piston 25 is normally maintained in mid-position by means of springs 30 and 31, interposed between the end plates 26 and 27 respectively, and the inner ends of spring cages 32 and 33, these cages being held against further movement toward the center of the fluid motor by means of flanges 34 and 35 adapted respectively to abut against shoulders 36 and 37 formed in the cylinder 24. It will be understood that this novel arrangement permits the springs 30 and 31 to be preloaded in such a manner as to oppose movement of the piston from the neutral position shown in either direction with any predetermined degree of force desired, the force opposing movement of the piston from neutral position varying directly with the degree of movement, however, as soon as the piston starts to move in either direction. It will be apparent from the foregoing description, that in order to initially move the control surface actuated by the motor, it will be necessary to increase the pressure on one side or the other of the piston sufficiently to overcome the preloading of the neutralizing springs, after which any further increase in pressure serves to correspondingly increase the force exerted by the motor to move the control surface.

In order that the airplane may be properly controlled by the pilot, and referring to Fig. 1, the controls are preferably of a conventional nature, a control stick 38 serving to operate a control valve unit 39 for controlling the operation of the ailerons and elevator as will be more fully described hereinafter, and a rudder bar 40 serving to control the operation of the rudder 7, this rudder bar having an operative connection with a control valve 41 and a control valve 42 which serve to control the degree of pressure in either end of the motor 11 and thus to control the operation of the rudder 7 to control the direction of movement of the airplane. The control valves 39, 41 and 42 are supplied with fluid pressure from a reservoir 43, which in turn is supplied with fluid pressure from a suitable compressor, not shown, through the medium of a conduit 44.

Referring more particularly to Fig. 3 of the drawings, the control valve 41 is shown in section as including a casing 45, provided with an inlet chamber 46, separated from a cylindrical bore 47 formed in the casing, by means of a partition 48 provided with a centrally located port 49 for permitting communication between the inlet chamber 46 and the interior of the cylinder. The cylinder is divided into an outlet chamber 50 and an exhaust chamber 51 by means of a piston 52 slidably mounted therein. Communication between the inlet chamber 46 and the outlet chamber 50 is normally prevented by means of an inlet valve 53 provided with a valve stem 54 having an exhaust valve 55 formed on its right end, the intake valve being maintained in the position shown by means of a spring 56 interposed between the right side of the partition 48 and the left side of the exhaust valve 55. The piston is provided with a tubular portion 57 having a port 58 extending therethrough, and adapted at its lower end on movement of the piston to the left, to engage the exhaust valve 55, the right end of the bore being in communication with the exhaust chamber 51, this chamber in turn being connected with atmosphere through an exhaust conduit 59 as shown. The piston is normally maintained in the position shown by means of a relatively light spring 60 interposed between the partition 48 and the left face of the piston, movement of the piston to the left being accomplished through the medium of a graduating spring 61 interposed between the right face of the piston and the left face of a valve operating plunger 62 adapted for operation by the rudder bar 40.

As heretofore stated, the use of preloaded springs for neutralizing the piston in the fluid motor makes it desirable to immediately supply a pressure to the fluid motor sufficient to overcome the tension of these springs on operation of the pilot's control element, and this is accomplished in the present instance by preloading the graduating spring 61 in a manner to be hereinafter described. A cage 63 is interposed between the left end of the plunger 62 and the right end of the graduating spring 61, the left end of the cage being provided with a ported flange 64 slidably mounted on the tubular portion 57 of the piston, movement of the cage to the right under the action of the graduating spring 61 being prevented by means of a suitable nut 65 threadedly mounted on the right end of the tubular portion 57, it thus being possible to preload the graduating spring 61 to any desired degree by properly choosing the length of the cage and by properly adjusting the nut 65, without however, permitting the graduating spring to expand in the position shown sufficiently to force the piston to the left in order to close the valve 55 and open the inlet valve 53. Thus on initial movement of the valve operating plunger 62 to the left on operation of the rudder bar 40, the assembly comprising the piston 52, the graduating spring 61, the nut 65 and the cage 63 moves as a complete unit and provides a non-resilient connection between the plunger 62 and the piston until such time as the pressure acting on the left end of the piston in chamber 50 is sufficient to overcome the preloading of the graduating spring, it being noted that for all pressures above this pressure, the graduating spring may be compressed as desired due to the fact that the cage 63 is mounted to slide to the left on the tubular portion 57 of the piston. Thus on movement of the rudder bar 40 in a counter-clockwise direction to operate the plunger 62, the entire graduating spring and piston assembly will be moved to the left, first contacting the exhaust valve 55 and closing the bore 58 and subsequently opening the inlet valve against the force exerted by the spring 56 in order to establish a connection between the inlet chamber 46 and the outlet chamber 50, and in the event the rudder bar is moved just sufficiently to open the inlet valve, it will be understood that as soon as the pressure in the outlet chamber 50 acting on the piston 52 is sufficient to overcome the preload of the graduating spring, the piston will be moved to the right, compressing the graduating spring and permitting the spring 56 to move the inlet valve 53 to closed position, thus lapping the valve. When this condition occurs, further movement of the rudder bar to move the plunger 62 to the left will again move the piston to the left to open the inlet valve and admit further pressure to the outlet chamber 50, whereupon the pressure acting on the piston will again force the latter to the right to further compress the graduating spring and establish a condition of balance.

The valve 39, as more fully illustrated in Fig. 4, is also of similar construction and provided with preloaded graduating springs. As illustrated in the drawing, the valve is provided with a casing 66, the casing being provided with four symmetrically arranged vertical bores, one of these bores being designated as 67 and provided with a piston 68 slidably mounted therein. The piston serves to divide the cylindrical bore into outlet and exhaust chambers 69 and 70, the exhaust chamber being connected with atmosphere through the medium of a passage 71 and an atmospheric port 72 connected therewith. The piston is normally maintained in the position shown by means of a relatively light spring 73 sufficient to carry the weight of the piston, and movement of the piston downward is accomplished through the medium of a graduating spring 74 interposed between the upper surface of the piston and a flange 75 formed on the upper end of a spring cage 76 slidably mounted on a central tubular portion 77 of the piston, the upper face of the flange abutting the lower end of a valve operating plunger 78. In order that the graduating spring may be preloaded in the same manner as the graduating spring already described in connection with the control valve 41 illustrated in Fig. 3, the cage 76 is retained against upward movement relative to the piston by means of a flange 79 engaging a nut 80 threadedly received by the tubular portion 77 of the piston, it being apparent that on downward movement of the valve operating plunger 78, the cage can move with relation to the piston and permit compression of the graduating spring. The lower portion of the casing 66 is provided with an inlet chamber 81, to all the valves, this inlet chamber being separated from the bore 67 by means of a partition 82 provided with a centrally located port 83 to permit communication between the inlet and outlet chambers. This port is normally closed by means of an inlet valve 84 provided with an upwardly extending stem 85 having an exhaust valve 86 formed at its upper end, the valve assembly being maintained in the position shown by means of a spring 87 interposed between the upper face of the partition 82 and the lower face of the exhaust valve 86. The tubular portion of the piston is provided with a centrally located bore 88, and it will be understood that on initial downward movement of the valve operating plunger 78, the assembly comprising the piston, the graduating spring 74 and the valve spring cage 76 will move as a solid unit and impart downward movement of the piston, to first bring the lower end of the bore 88 in contact with the exhaust valve to close off communication between the outlet chamber 69 and atmosphere through the bore 88, the exhaust chamber 70, the passage 71 and the port 72, and to subsequently open the inlet valve 84 to permit communication between the inlet chamber 81 and the outlet chamber 69. Thus on initial movement of the valve operating plunger 78 to slightly open the intake valve, the inlet valve will remain in this position until the pressure in the outlet chamber 69 increases to a value sufficient to force the piston upward against the preloading of the graduating spring, at which time the inlet valve will be moved to closed position under the action of the spring 87, and the pressure in the outlet chamber will be determined by the degree of preloading of the graduating spring. Further downward movement of the plunger 78 will again force the piston downward to admit pressure to the outlet chamber, and the increased pressure will force the piston upward again to compress the graduating spring and allow the valve to move to lapped position. Thus when the initial preloading of the graduating spring is overcome, further increases in pressure in the outlet chamber will be proportional to the degree of displacement of the valve operating plunger 78, in a manner well-known to those skilled in the art.

The other three self-lapping valve mechanisms in the control valve unit 39 are similarly constructed and provided with valve operating plungers 88, 89 and 90 respectively, and in order that these plungers and the corresponding valves may be selectively or concurrently operated by the pilot to control the pressures delivered by the corresponding control valve, the pilot's control element 38 is mounted for universal movement with respect to the casing 66 by means of a ball joint 91 formed on the lower end of the control element and suitably carried by a spherical socket 92 formed in the casing. A connection between the control element and the valve operating plungers is effected by means of a flange 93 formed on the lower end of the control element and having its lower surface normally in contact with all of the valve operating plungers. In order to prevent the entrance of dirt into the mechanism of the valve, a dome-shaped cover 94 is provided having a centrally located opening 95 formed at its upper end to permit movement of the control element in all directions from the neutral position shown, the entrance of dirt into the casing through this opening being prevented by means of a flange member 96 slidably mounted on the control element and having an upper surface 97 adapted to conform to the contour of the interior of the cover 94, this surface being maintained in contact with the interior of the cover by means of a spring 98 interposed between the upper face of the flange 93 and the lower face of the member 96.

The control valve actuated by the plunger 78 is designated as 99, the other control valves, reading in a clockwise direction when viewed from the top of the control valve structure being designated as 100, 101 and 102. Thus it will be understood that, as viewed in Fig. 4, rocking of the control element 38 to the left will depress the plunger 78 and serve to establish a connection between the inlet chamber 81 and the outlet chamber 69, while movement of the element 38 in a clockwise direction will depress a plunger 89 which serves to control the operation of the valve 101. The valve 100 is provided with the operating plunger 88, and movement of the control element 38 away from the operator as viewed in Fig. 4 will depress this plunger in order to provide corresponding operation of the valve 100, operation of the element in a reverse direction serving to depress the plunger 90 to operate the valve 102. It will also be understood that the control element may be moved in an intermediate direction in order to provide concurrent operation of any two adjacent control valves if desired.

Referring again to Fig. 1 of the drawing, it will be noted that the outlet chambers of the control valves 99, 100, 101 and 102 are provided with outlet conduits 105, 106, 107 and 108, the inlet chamber 81 being connected with the reservoir 43 by means of a conduit 109. As indicated on the drawing, the outlet conduit 105 is connected with the right end of the fluid motor 10, while the outlet conduit 107 is connected with the left end of the motor, it thus being apparent that the supply of fluid pressure to the right end of the motor is controlled by the operation of the valve 99, while the application of fluid pressure to the left end of the motor is controlled by the valve 101. In like manner, the outlet conduit 106 is connected to the left end of the fluid motor 8 through the medium of a conduit 110, likewise connected with the left end of the motor 9, while the outlet conduit 108 is connected with the left end of the fluid motor 9 and with the right end of the motor 8 through the medium of a conduit 111, the valves 100 and 102 therefore serving to control the operation of the fluid motors 8 and 9 in order to control the ailerons 4 and 5. The inlet chamber of the valve 41 is connected with the inlet chamber of the valve 42 by means of a conduit 112, this latter conduit being supplied with fluid pressure from the reservoir 43 through a conduit 113. The outlet chamber of the valve 41 is connected with the right end of the rudder motor 11 by means of a conduit 114, while the left end of the motor is connected with the outlet chamber of the control valve 42 through a conduit 115, the operation of the valve 41 and 42 thus controlling the supply of fluid pressure to the right and left ends of the motor 11 respectively.

With the plane in level flight under normal conditions, it will be understood that all of the control surfaces are maintained in neutral position by means of the preloaded springs associated with the corresponding actuating motors, and in the event the pilot desires to move the elevator 6 in a counter-clockwise direction, for example, the control element 38 is moved to the right in the plane of the valve operating plungers 78 and 89 to depress the plunger 89 and operate the valve 101 to connect conduits 109 and 107 to establish a pressure in the left end of the motor 10 sufficient to overcome the preloading of the neutralizing spring therein, this occurring during a slight initial movement of the element 38 as heretofore described. When the pressure in the left end of the motor 10 reaches a value sufficient to overcome the preloaded springs in the motor, the pressure likewise is sufficient to overcome the preloading of the graduating spring in the valve 101 and to consequently move the valve to lapped position to maintain this pressure in the motor. On further movement of the control element 38 in the same direction, the plunger 89 will be further depressed, and any further increase in pressure in the left end of the motor will be directly proportional to the degree of displacement of the plunger and consequently to the angle of movement of the control element, this resulting in immediate energization of the motor to overcome the preloaded spring on initial movement of the control element, further movement of the control element in the same direction increasing the pressure in the left end of the motor in direct proportion to the degree of movement of the control element and in like manner increasing the output of the motor in the same proportion. Movement of the elevator 6 in a clockwise direction may be accomplished by moving the control element to the left in the above plane in order to depress the plunger 78 and to cause the valve 99 to function in like manner to first supply pressure to the right end of the motor 10 sufficient to overcome the preloaded springs therein on initial movement of the control element, and on further movement of the control element to increase the pressure in the right side of the motor 10 in direct proportion to the further degree of displacement of the control element.

Control of the ailerons is obtained by rocking the control element in a plane at right angles to that above described, rocking of the element to the right in this plane, as viewed by the pilot, serving to actuate the valve 100 to supply fluid pressure from the reservoir to the left end of the motor 8 through conduits 106 and 110 to move the aileron 4 in a counter-clockwise direction and to supply fluid pressure to the right end of the motor 9 through conduits 106 and 110 to move the aileron 5 in a clockwise direction, thus tending to lift the left wing of the plane and lower the right wing of the plane in order to control the direction of flight, it being understood that here again, initial movement of the control element operates the valves to immediately supply pressure to the motors sufficient to overcome the neutralizing force exerted by the preloaded springs in the motors, further movement serving to increase the pressure in the motors in direct proportion to the degree of further displacement of the control element. In like manner, movement of the control element in the other direction in the above plane operates the valve 102 to supply fluid pressure from the reservoir to the left end of the motor 9 through conduit 108 and to the right end of the motor 8 through conduits 108 and 111, this action resulting at clockwise rotation of the aileron 4 and counter-clockwise rotation of the aileron 5 to tilt the airplane in the other direction. In the event the pilot desires to concurrently control the ailerons and the elevator, it is only necessary for him to rock the control element in a plane intermediate the above planes in order to obtain the degree of control desired with respect to both sets of control surfaces, the resultant control thus being similar to that now utilized in conventional planes, except for the fact that the control is exerted through a fluid column without the necessity of a direct mechanical connection being used.

In view of the nature of the control valve mechanism utilized, it will be understood that the controlling force exerted by the fluid motors is, after initial movement thereof to overcome the preloaded springs in the motors, directly proportional to the degree of movement of the control element, and that the forces exerted by the motors cannot exceed this value regardless of any action of the slip stream on the control surfaces which might tend to compress the fluid in the motors, it being understood that due to the self-lapping action of the control valves, any fluid so compressed in the motors immediately increases the pressure in the corresponding outlet chambers to raise the corresponding pistons and permit the compressed fluid to exhaust from the valve. In the event a compressible medium is utilized in a system of this type, it will be understood that this resilient medium insures that the forces exerted on the control surfaces by the slip stream will be opposed by similar resilient forces which will allow the surfaces to adjust themselves to their most efficient position in relation to the slip stream in accordance with changes in the speed of the airplane. In the event the system is properly designed with respect to the maximum forces exerted by the motors, it will be clear that it would be impossible for the pilot to over-stress the plane or to change the direction of movement of the plane with sufficient rapidity to damage the structure.

The rudder bar 40 is pivotally mounted on the structure of the plane by means of a pivot pin 116, the rudder bar normally being in engagement with the right end of the valve operating plunger 62 as well as with a similar valve operating plunger 117 in the valve 42. Thus on rotation of the rudder bar 40 in a counter-clockwise direction the plunger 62 will be depressed to operate the valve 41, the valve serving to establish a connection between conduits 112 and 114 to supply fluid under pressure to the right end of the motor 11 to steer the airplane to the right, the initial pressure again being sufficient to overcome the preloading spring, and any further increases in pressure being proportional to the degree of rotation of the rudder bar. In like manner rotation of the rudder bar in a clockwise direction will actuate the valve 42 in a similar manner to supply fluid pressure to the left end of the motor 11 through the conduit 115 in order to turn the plane to the left.

As heretofore stated, novel means have been provided in connection with a fluid pressure control system for the control surfaces of an airplane to normally maintain the control surfaces in neutral position during normal level flight, but in view of the fact that the distribution of load in an airplane necessarily changes with a resultant detrimental effect on the balance of the airplane, means are illustrated diagrammatically in Fig. 5 for changing the neutral position of the control surfaces at the will of the pilot in order to compensate for changes in the distribution of the load in the airplane. Referring therefore to Fig. 5, the double acting cylinder 10 for operating the elevator is illustrated as being provided with a pivot pin 117 carried by a bracket 118 formed thereon, the pivot pin being connected with the upper end of a lever 119 connected to a shaft 120 by means of a suitable key 121, the shaft 120 being mounted in suitable bearing, not shown, for rotation with respect to the fuselage of the airplane. A worm wheel 122 is also mounted on the shaft for rotation therewith, and engages a worm 123 mounted for rotation with a control shaft 124 rotatably supported in bearings 125 and 126 mounted on the fuselage of the plane, the left end of the shaft 124 being provided with an operating wheel 127.

It will be understood from the foregoing, that on operation of the control wheel 127, the shaft 120 can be rotated in either direction to change the angularity of the lever 119 and to correspondingly move the pin 117 and the cylinder 10 either to the right or to the left in order to change the position of the entire cylinder relative to the fuselage of the plane, the preloaded springs carried by the cylinder, in the same manner as those illustrated in Fig. 2 of the drawings, serving to maintain, with respect to the cylinder, a neutral position of the control surface connected to the piston of the cylinder as heretofore described, movement of the entire cylinder thus serving to change the effective neutral position of the control surface at the will of the operator, without in any way affecting the action of the fluid pressure control system in controlling the operation of the fluid motor to operate the control surface from neutral position in either direction. There has thus been provided by the present invention, not only means for controlling the control surfaces of the plane remotely by fluid pressure and for normally maintaining the control surfaces in neutral position, but also for varying this neutral position at will under the control of the pilot, it being understood that the mechanism shown in Fig. 5 can, if desired, be utilized in connection with any of the fluid motors illustrated in Fig. 1, in order to provide a flexible and efficient control of the airplane under all conditions of load distribution.

While the invention has been illustrated and described herein with considerable particularity, it is to be understood that the same is not limited to the form shown but may receive a variety of expressions as will readily appear to those skilled in the art. Reference will, therefore, be had to the appended claims for a definition of the limits of the invention.

What is claimed is:

1. Control mechanism for controlling the direction of flight of an airplane, said mechanism including a rudder mounted on the airplane for movement in either direction from a neutral position, a pilot's control element movable in either direction from a neutral position, and means for maintaining said rudder in neutral position, and for resiliently biasing said rudder away from neutral position in either direction with a force substantially proportional to the degree of movement of said control element from neutral position in a corresponding direction regardless of any opposing force exerted on said rudder by the slip stream of the airplane, said means including a source of compressed gas, a double acting fluid motor having a movable pressure responsive member connected with the rudder, preloaded spring means associated with said member for opposing movement of the latter and rudder from neutral position in either direction with a predetermined force, a pair of self-lapping valve mechanisms each having a valve operating member and operable selectively to establish communication between said source and motor to supply compressed gas thereto to exert a biasing force on said pressure responsive member in one direction or the other, and a separate preloaded spring interposed between each of said valve operating members and said control element, said springs and the degree of preloading thereof being so chosen and so constructed and arranged with respect to the degree of preloading of said spring means as to insure operation of said valve mechanisms to supply compressed gas to the motor at a pressure sufficient to substantially balance the predetermined force exerted by said spring means on slight initial movement of said element from neutral position sufficient to overcome the preloading of said springs, and on further movement of said element from neutral position to increase said pressure to a value substantially in proportion to the degree of said further movement and to maintain said pressure at said value.

2. Control mechanism for controlling the direction of flight of an airplane, said mechanism including a rudder mounted on the airplane for movement in either direction from a neutral position, a pilot's control element movable in either direction from a neutral position, and means for maintaining said rudder in neutral position with a predetermined force when said element is in neutral position, and for resiliently biasing said rudder away from neutral position in either direction with a force substantially proportional to the degree of movement of said control element from neutral position in a corresponding direction regardless of any opposing force exerted on said rudder by the slip stream of the airplane, said means including a source of compressed gas, a double acting cylinder having a piston slidably mounted therein and connected with the rudder, preloaded spring means associated with said piston for opposing movement of the piston and rudder from neutral position in either direction with said predetermined force, a pair of self-lapping valve mechanisms each having a valve operating member and operable selectively to establish communication between either end of said cylinder and said source to supply compressed gas thereto to exert a biasing force on said piston in one direction or the other, and a separate preloaded spring interposed between each of said valve operating members and said control element, said springs and the degree of preloading thereof being so chosen and so constructed and arranged with respect to the degree of preloading of said spring means as to insure operation of said valve mechanisms to supply compressed gas to the cylinder at a pressure sufficient to cause the force exerted by the piston to substantially balance the predetermined force exerted by the spring means on slight initial movement of said element from neutral position sufficient to overcome the preloading of said springs, and on further movement of said element from neutral position to increase said pressure to a value substantially in proportion to the degree of said further movement and to maintain said pressure at said value.

3. Control mechanism for controlling the direction of flight of an airplane, said mechanism including a pair of ailerons mounted on the airplane for movement in either direction from a neutral position, a pilot's control element movable in either direction from a neutral position, and means for maintaining each of said ailerons in neutral position with a predetermined force when said element is in neutral position, and for resiliently biasing said ailerons away from neutral position in opposite directions with forces substantially proportional to the degree of movement of said control element from neutral position, regardless of any opposing forces exerted on said ailerons by the slip stream of the airplane, said means including a source of compressed gas, a double acting fluid motor positioned adjacent each aileron having a movable pressure responsive member connected with the corresponding aileron, preloaded spring means associated with each pressure responsive member for opposing movement of the latter and the corresponding aileron away from neutral position with said predetermined force, a self-lapping valve mechanism having a valve operating member and operable to supply compressed gas from said source to one end of each of said motors to exert biasing forces on said pressure responsive members and ailerons in opposite directions, a second self-lapping valve mechanism having a valve operating member and operable to supply compressed gas from said source to the other ends of said motors to exert biasing forces on said pressure responsive members and ailerons in directions the reverse of said opposite directions, and a separate preloaded spring interposed between each of said valve operating members and said element for permitting selective operation of said valve members by the element, said springs and the degree of preloading thereof being so chosen and so constructed and arranged with respect to the degree of preloading of said spring means as to insure operation of said valve mechanisms to supply compressed gas to said motors at a pressure sufficient to substantially balance the predetermined forces exerted by the spring means on slight initial movement of the control element away from neutral position sufficient to overcome the preloading of said springs, and on further movement of the element away from neutral position to increase said pressure to a value substantially in proportion to the degree of said further movement and to maintain said pressure at said value.

4. Control mechanism for controlling the direction of flight of an airplane and for limiting the stresses imposed on said airplane by the operation of said control mechanism, said mechanism including a rudder mounted on the airplane for limited travel in either direction from a neutral position, a pilot's control element movable in either direction from a neutral position, and means for maintaining said rudder in neutral position with a predetermined force when said element is in neutral position, and for moving said rudder through its entire travel from neutral position when the airplane is moving at a relatively low speed and the force exerted on the rudder by the airplane slip stream is correspondingly low and for moving the rudder through a lesser portion of said travel as the speed of the airplane increases, said means including a source of compressed gas, a double acting fluid motor having a movable pressure responsive member connected with said rudder, preloaded spring means associated with said pressure responsive member for opposing movement of the latter and rudder from neutral position with said predetermined force, a pair of self-lapping valve mechanisms each having a valve operating member and operable selectively to supply compressed fluid from the source to one or the other end of said motor to exert a biasing force on said member in one direction or the other from neutral position, and a separate preloaded spring interposed between each of said valve operating members and the control element, said springs and the degree of preloading thereof being so chosen and so constructed and arranged with respect to said spring means and the degree of preloading thereof as to insure operation of said valve mechanisms to control the pressure of compressed gas supplied to said motor, so that the force exerted by the pressure responsive member is sufficient to substantially balance the force exerted by said spring means on slight initial movement of the control element from neutral position sufficient to overcome the preloading of said springs, whereby the force exerted by the pressure responsive member increases substantially in proportion to the degree of further movement of said control element from neutral position, and whereby the maximum force exerted by said pressure responsive member is sufficient to move the rudder through its full travel when the airplane is traveling at said relatively low speed and is insufficient to move the rudder through said full travel when said speed is increased.

WILFRED A. EATON.

REFERENCES CITED

The following references are of record in the file of this patent:

UNITED STATES PATENTS

| Number | Name | Date |
|---|---|---|
| 2,075,917 | Vorech | Apr. 6, 1937 |
| 2,209,144 | Vogt | July 23, 1940 |
| 1,516,164 | Vickers et al. | Nov. 18, 1924 |
| 2,104,037 | Swisher | Dec. 13, 1938 |
| 1,224,357 | Bullington | May 1, 1917 |
| 2,227,375 | Carlson | Dec. 31, 1940 |
| 1,339,332 | Greenly | May 4, 1920 |
| 2,133,275 | Andres et al. | Oct. 18, 1938 |
| 2,273,171 | Bennett | Feb. 17, 1942 |
| 2,346,820 | Casler et al. | Apr. 18, 1944 |

FOREIGN PATENTS

| Number | Country | Date |
|---|---|---|
| 436,317 | Great Britain | Oct. 9, 1935 |
| 130,213 | Great Britain | July 31, 1919 |